W. W. Peck.
Imp'd Gate & Barn-Door Fastening.
No 72536. Patented Dec. 24, 1867.
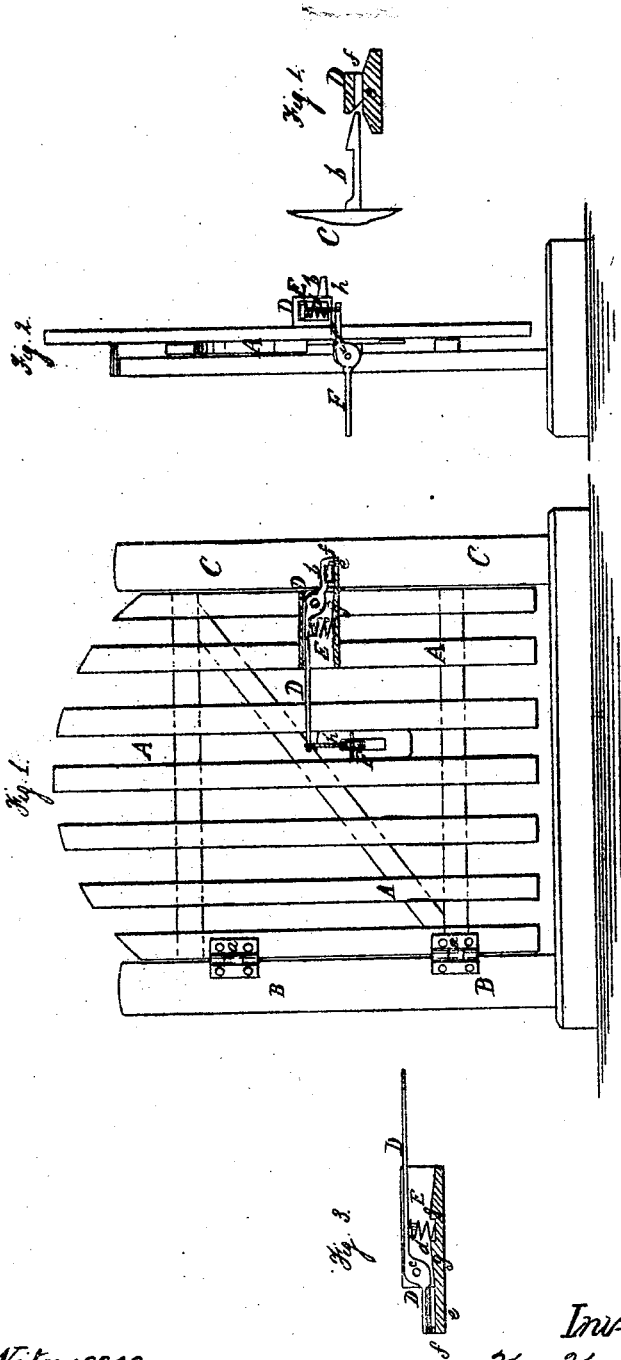
Witnesses.
Theo. Trische.
Fred B. Miles.
Inventor.
W. W. Peck
Per Munn &
Attorneys

United States Patent Office.

W. W. PECK, OF CASSAPOLIS, MICHIGAN.

Letters Patent No. 72,536, dated December 24, 1867.

---

IMPROVED GATE AND BARN-DOOR FASTENING.

---

*The Schedule referred to in these Letters Patent and making part of the same.*

---

TO ALL WHOM IT MAY CONCERN:

Be it known that I, W. W. PECK, of Cassapolis, Cass county, Michigan, have invented a new and improved Gate and Barn-Door Fastening; and I do hereby declare that the following is a full, clear, and exact description thereof, which will enable others skilled in the art to make and use the same, reference being had to the accompanying drawings, forming a part of this specification, in which—

Figure 1 represents a front view, partly in section, of my invention.

Figure 2 is a vertical cross-section of the same.

Figure 3 is a detail longitudinal sectional view of the same.

Figure 4 is a detail cross-section of the same.

Similar letters of reference indicate corresponding parts.

This invention relates to a new fastening for gates and barn-doors, which is so constructed that the gate or door can be opened from the inside and outside, or from the former only, as may be desired, and so that the same cannot be raised, and thus opened, by hogs and other animals.

The whole device is of very simple construction, and can be very cheaply made; and provision is made that it will work easy, and that it cannot be destroyed by water, provision being made that the latter must run off.

A represents a gate or door, of ordinary construction, which is hinged, by hinges $a a$, to a post, B. C is the post on the opposite side of the gate; and to it a catch, $b$, is firmly secured. The latter is pointed towards its end, and is provided with a shoulder for holding the latch, as is clearly shown in fig. 4. D is the latch, which is encased in a box, E, which is open at the ends, and which may be closed on top, as in fig. 1, or open, as in fig. 3. This box is firmly secured on the inside of a barn-door or gate, close to its swinging end. The latch is pivoted between the sides of the box by a bolt, $c$, as shown. $d$ is a spiral or other spring, which is arranged between the bottom of the box and handle of the latch, and which serves to depress the end of the latch. From the bottom of the box E projects a tongue, $e$, which fits under the catch $b$, and prevents the gate from being raised by hogs, &c., when closed. The sides of this tongue are bevelled, as is clearly shown in fig. 4, to make it pass easily under the pin, even if it should fit a little too tight. That lower edge of the latch which is to slide on the catch is bevelled, as seen in fig. 4, while the other edge is sharp, to fit against the shoulder on the catch. The extreme end of the latch is provided with a short downward projection, $f$, by which it is held a little above the tongue when the gate is open, (see fig. 3,) so as to leave a space for the end of the catch $b$ to enter, and to raise the latch. The upper surface of the bottom of the box E is made slanting from the centre to both ends, as is clearly shown in fig. 3. Water will thereby be prevented from accumulating in and thereby destroying the device. The handle of the latch D is connected, either directly by a pivot, or by a wire rod, $h$, with the end of a lever, F, which is passed, from one side to the other, through the gate, and pivoted in the same by a pin, $i$, as is clearly shown in figs. 1 and 2. Thus, by depressing the hands of the latch D, or by raising the handle of the lever F, the gate can be opened either from the inside or outside, as may be desired.

Whenever it is found desirable, the lever F can be easily detached from the latch, and be removed from the gate or door, when the same can only be opened from the inside.

Having thus described my invention, what I claim as new, and desire to secure by Letters Patent, is—

1. The removable extension-handle F, in combination with the spring-latch D, box E, and catch $b$, substantially as herein described for the purpose specified.

2. The box E, when provided with a tongue, $e$, the spring $d$, and the catch D, the latter being provided with projections $f$ and catch $b$, in combination with each other and with the lever F, all made and operating substantially as herein shown and described.

W. W. PECK.

Witnesses:
WM. F. MCNAMARA,
ALEX. F. ROBERTS.